June 8, 1971 R. G. PILLER 3,583,896
DETECTION AND CONTROL OF ELECTRODE UPSETS
Filed March 25, 1968 3 Sheets-Sheet 1

INVENTOR
RICHARD G. PILLER

BY *Glenn, Palmer & Lyne*

ATTORNEYS.

June 8, 1971  R. G. PILLER  3,583,896
DETECTION AND CONTROL OF ELECTRODE UPSETS
Filed March 25, 1968  3 Sheets-Sheet 3

INVENTOR
RICHARD G. PILLER

BY *Glenn, Palmer & Lyne*

ATTORNEYS.

United States Patent Office 3,583,896
Patented June 8, 1971

3,583,896
DETECTION AND CONTROL OF ELECTRODE UPSETS
Richard G. Piller, Gresham, Oreg., assignor to Reynolds Metals Company, Richmond, Va.
Filed Mar. 25, 1968, Ser. No. 715,885
Int. Cl. B01k 3/00; C22d 3/12
U.S. Cl. 204—67                              9 Claims

ABSTRACT OF THE DISCLOSURE

A method of detecting "electrode upsets" in an aluminum reduction cell wherein the cell's zero-current intercept ($E_k$) is monitored. An $E_k$ value lower than a predetermined level indicates the existence of an "electrode upset." A method of controlling such upsets is also described wherein the cell is operated in a previously known manner until such time as its $E_k$ value falls below the predetermined minimum level at which time the cell is caused to undergo an anode effect.

---

This invention relates to methods of detecting and correcting "upset" conditions in electrolytic reduction cells, and more particularly to methods for detecting and correcting conditions in an alumina reduction cell at a time during which the cell undergoes a substantial departure from normal operating conditions and suffers serious reductions in efficiency and productivity.

Recently, several methods have been developed for more efficiently controlling the operation of electrolytic cells for the reduction of alumina. In large part, these new cell control methods have been directed toward increasing the efficiency of normally operating cells in good condition. In fact, one of the objects of those new methods could be described as being to reduce the frequency with which a reduction cell becomes "upset."

This invention, on the other hand, is concerned more with detecting upset conditions of a particular type as well as a method for correcting those conditions after they are detected.

Reduction cells are subjected to various types of upsets, most of which have certain similar characteristics and effects, but each of which requires a different type of corrective action. In fact, steps for effectively correcting one type of upset can serve to aggravate another. One type of upset is particularly troublesome in connection with "Soderberg" cells. That type stems from the cell's having an improper "ledge" thickness. Another type of upset exists when undissolved alumina settles out at the bottom of the cell causing an upset which is normally referred to as a "sludging" upset. Another type of upset occurs when a cell has a "low carbon." This invention is particularly related to the detection of still another type of upset which relates to the portion of the cell's electrochemical reactions taking place at the anode and cathode electrode surfaces. Hence, it will be referred to herein as an "electrode" upset.

Methods of detecting low carbon and sludging types of upsets have previously been described. For example, it has been previously known that a ripple voltage of about 2 to 25 c.p.s. is imposed upon the cell's DC voltage both when the cell is in a sludge condition and when an individual carbon block of a prebake cell anode is set lower than the cell's other anode blocks. The same type of ripple voltage also occurs when a piece of carbon breaks off of a Soderberg cell's anode and becomes wedged underneath. In both of these latter cases, a certain portion of the anode conducts more than its share of current and the cell becomes upset. It has been known, therefore, that sludging and low carbon upsets can be detected by monitoring the cell for the presence of a ripple voltage.

Alumina reduction cells also undergo other types of upsets which, to date, have not had suitable detection methods and therefore have been difficult to correct. Applicant has discovered certain cell characteristics which indicate the existence of electrode upsets. Those characteristics and their control shall be described shortly.

In the past, if a cell operator was unable to determine a particular type of upset condition, the accepted corrective action was to cause the cell to undergo a series of anode effects during which the voltage across the cell suddenly increases from about 5 to as high as 50 volts. In this respect, an anode effect stems from the cell's having an abnormally low alumina content and results in a severe reduction in the cell's production. Anode effects are, nevertheless, frequently used as control measures to correct upsets which, although known to exist, have not been previously detectable as to type. In addition to describing a method for detecting upsets, therefore, it is an object of this invention to increase aluminum production by reducing the number of anode effects to which cells have previously been subjected. Moreover, during the time that a cell is awaiting an anode effect, its aluminum production gradually decreases. Hence, this invention not only permits the increased efficiency due to a reduced number of anode effects per se, but it permits increased efficiency by restricting the build-up and recovery periods that accompany anode effects.

It is certainly advantageous to be able to detect different types of anode effects, because, once detected, an experienced operator can take certain corrective steps to eliminate the upset. An upset often occurs gradually, however, and causes a certain loss of cell efficiency between the time it begins and the time that it is detected by an operator. Consequently, it is still another object of this invention to provide a method for both detecting upsets earlier and correcting the upset conditions once they are detected.

In accordance with a principle of the invention, the cell's voltage is measured at various times and current levels so as to determine the cell's operating characteristics at given times. Projected zero-current intercept values, $E_k$, are then determined for those operating conditions. That is, for each condition, an extrapolation is made to determine what the cell's theoretical voltage would be if its current were zero. From this data a determination is made of the cell's "normal" $E_k$ value which, until recently, has been thought to be a constant. It has been discovered, however, that a cell's $E_k$ value is not constant, and moreover that it falls off sharply when the cell is experiencing an electrode upset. Consequently in practicing the invention, the cell's $E_k$ values are periodically determined and monitored. If the $E_k$ value falls below a predetermined level corresponding to the particular type of cell, it is taken as an indication that the cell is entering an electrode upset whereby operating procedures may be taken to control the cell so that the electrode upset can be reduced or eliminated.

Insofar as the control aspects of the invention are concerned, the $E_k$ value of the given cell is determinative of the action to be taken. So long as the $E_k$ value remains within a selected range of the previously determined "normal" value, the cell is considered to be in good condition and is operated accordingly. For example, it might be fed in proportion to the value of the cell's bath resistance at any given time. If the $E_k$ value falls below the selected range, the cell is approaching the previously described "electrode upset." At this point, the cell is caused to undergo an anode effect. In this manner, the cell is only required to intentionally undergo an anode effect at specifically determinable times as opposed to the wasteful previous practice of periodically causing anode effects as a matter of course.

The foregoing and other objects, features, and advantages of this invention will be apparent from the following more particular description of preferred embodiments thereof as illustrated in the accompanying drawings.

Figure 1:
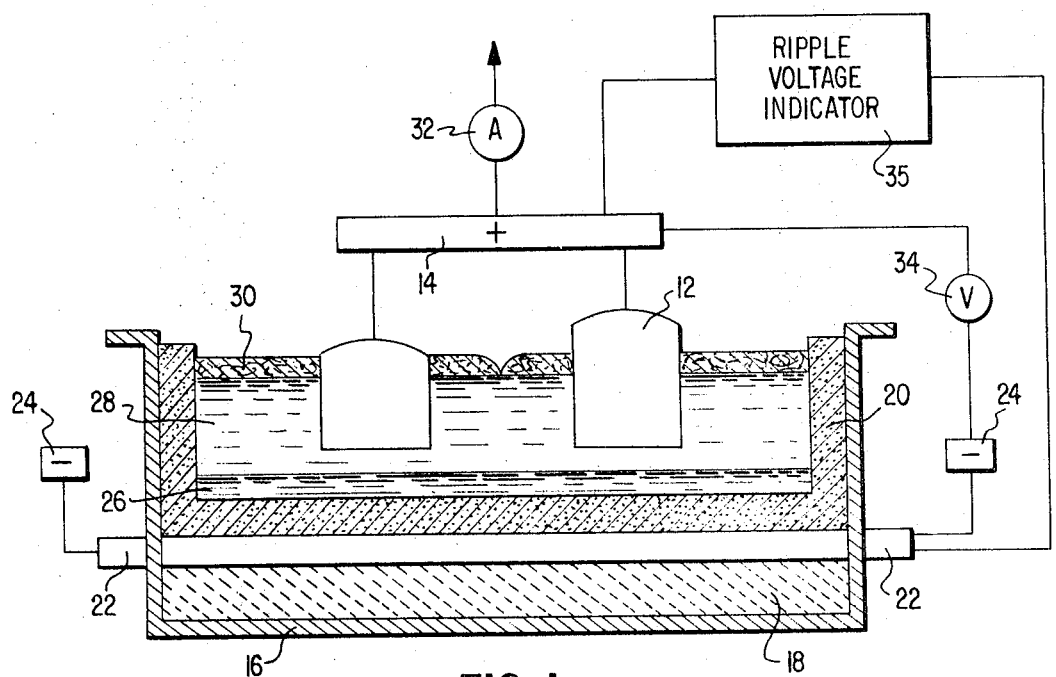
FIG. 1 is a schematic illustration of a prebake type of alumina reduction cell.

The schematic illustration of FIG. 1 represents one important type of aluminum reduction cell. This type of cell is known in the industry as a "prebake" cell and is to be particularly distinguished from a Soderberg type of cell which is equally well known. The illustrated prebake cell's anode is comprised of a plurality of carbon blocks 12. The anode of a Soderberg cell, on the other hand, is comprised of a single large mass of carbon that is baked in situ during the cell's operation. Although the instant invention is applicable to either type of cell, it will be primarily described in connection with a prebake cell. Certain references will be made, however, to application of the invention to Soderberg cells so that those skilled in the art will be able to apply the invention to whichever type of cell they prefer.

In the FIG. 1 schematic, each of the carbon blocks 12 is connected to a positive anode bus 14 by means of a suitable adjustable connection not shown.

The "pot" portion of the cell is comprised of a steel shell 16 which is lined with both an insulating layer 18 and a carbonaceous conductive lining 20. Iron rods 22 are embedded in the lining 20 and connected to a cathode bus 24. The lining 20 contains a pool of molten aluminum 26 and a bath 28 of alumina ($Al_2O_3$) dissolved in an electrolyte comprised of molten cryolite.

A suitable voltage forces an electrolyzing current to flow from the positive bus 14, through the carbon blocks 12, the bath 28, the molten aluminum 26, and the carbon cathode 20. The current then flows to the various current collecting iron rods 22 from which it is delivered to a subsequent cell by means of the cathode bus 24.

The molten electrolyte 28 is covered with a crust 30 which consists essentially of frozen cryolite constituents and additional alumina. As alumina is consumed, more may be fed into the bath by either breaking in a portion of a crust 30 or using a mechanical alumina-feeder, not shown. As the electrolytic process progresses, molten aluminum accumulates in the pool 26 and the alumina's oxygen is combined with the anode's carbon. Consequently, the accumulated aluminum must be periodically siphoned or "tapped" from the molten pool 26 and the carbon blocks must be replaced. In the prebake cells entire new carbon blocks are periodically inserted, while in Soderberg cells fresh carbon paste is added to the top of the single anode.

The current that is forced through the bath 28 is partially converted into heat. The largest portion of the current, however, is used to foster the electrolytic process; and the portion of the cell's current that is thusly used is indicative of the cell's efficiency. An overheated cell, therefore, can mean that an undesirably large amount of current is being wasted on heat whereby the cell is operating at a low efficiency.

Customarily, as many as 150 and more aluminum reduction cells are series connected. An ammeter such as 32 is used to measure the current through the cells; and a voltmeter such as 34 is used to measure the voltage across each cell. As will be described more fully later, electrochemists frequently plot an electrochemical cell's voltage E against the cell's current I to obtain a "characteristic curve."

A suitable ripple voltage indicator 35 is also connected across the cell to detect, amplify, and integrate a portion of the low frequency AC component that is superimposed on the cell's essentially DC voltage. The indicator 35 produces an indication or signal proportional to the amplitude of the AC current component. The significance of this indication's amplitude depends, among other things, on the degree of amplification, the accuracy of the instrument, and the degree with which it is desired to control the cell. Generally speaking, however, only a small amount of historical data is required to determine whether a given ripple voltage amplitude becomes significant and indicates that the associated cell is upset. In any event, when a significant ripple voltage amplitude is detected steps are taken to determine whether a "low carbon" or a "sludging" type of upset exists. In a prebake cell, the current is measured through individual carbon anode blocks 12. If one of the blocks carries an excessively high current, the upset is due to a "low carbon." Sludging upsets, however, are caused by excessive quantities of undissolved alumina particles in the bath 28 and usually occur after heavy feedings of alumina. This type of upset can be detected by determining the cell's alumina concentration.

Figure 2:
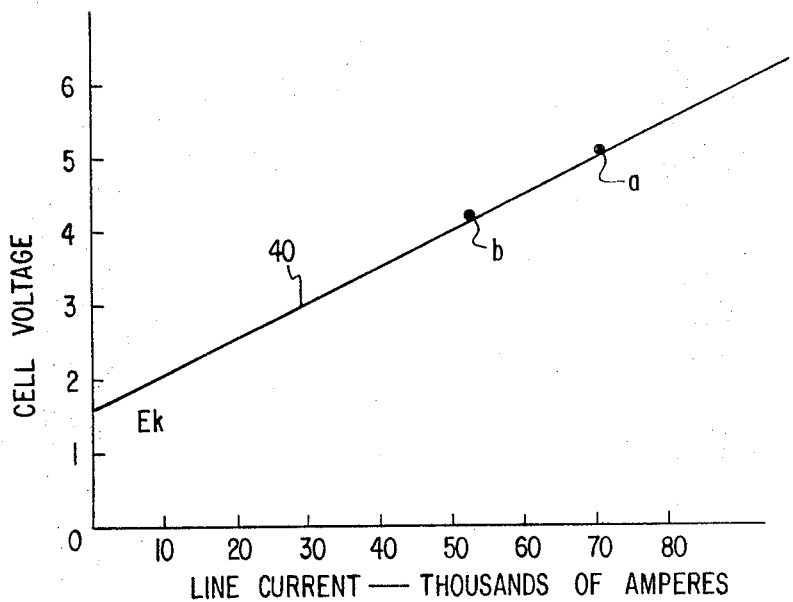
FIG. 2 illustrates a graphical method of determining the zero-current intercept of a tangent to the voltage-current curve of a reduction cell.

One suitable method for determining a cell's alumina concentration is described in U.S. patent application 411,463 which was filed on Nov. 16, 1964, now U.S. 3,380,897, on a commonly assigned invention of John L. Dewey. The Dewey application resulted from discoveries that were made in the course of plotting characteristic curves (Ev. 1) of various aluminum reduction cells. In this respect, and with reference to FIG. 2, a first current-voltage point $a$ was obtained by noting substantially simultaneously the respective values of the cell voltage $E_a$ and the line current $I_a$. Soon thereafter, the line current was changed to another value, $I_b$, and after waiting several seconds for the cell to adjust to the new current, the voltage, $E_b$, was noted. These values are represented by point $b$ on FIG. 2. A line was then drawn through the points $a$ and $b$ and extrapolated to the voltage axis of the graph. The point where this line 40 crosses the zero-current coordinate is conventionally referred to as the cell's zero-current intercept, $E_k$. This $E_k$ value is also variously referred to, among other things, as the cell's "back E.M.F." and "decomposition potential." In any event, prior to the Dewey invention set forth in S.N. 411,463, now U.S. Pat. 3,380,897, a cell's $E_k$ value was considered to be substantially constant. Dewey, however, discovered that the zero-current intercept of the tangent to a cell's voltage-current curve decreased as the cell's alumina content increased.

It was with respect to research related to the subject matter of the above described Dewey application that the instant invention was made. Prior to discussing those specifics, however, a bit more background will be noted in order that the invention may be more fully appreciated.

A low carbon upset is corrected by merely adjusting the anode position. Correction of sludging upsets is neither as quick nor as simple. That is, sludge upsets are caused by too high an alumina content, but mere termination of feeding is not the whole solution because unless feeding is resumed in a timely manner, the cell's alumina content drops to the point where the cell enters into an anode effect whereby the cell's aluminum production drops off considerably. Nevertheless, because of the difficulties in determining a cell's alumina content, it has been the general practice of the industry to cause cells to undergo repeated and sometimes frequent anode effects because, although undesirable in and of themselves, most experienced operators prefer anode effects to sick pots. The Dewey invention permitted cell operators to more rapidly determine a cell's alumina concentration.

Hence, it has been possible to correct sludging types of upsets by reducing or terminating a cell's alumina feed, but prevent anode effects by resuming normal feed rates when the cell's alumina concentration approach the point where the cell might undergo an anode effect. In this respect, the Dewey invention (411,463) can be considered as a "break-through." But in perfecting operating procedures relating to Dewey's alumina concentration determinations, it was discovered that certain cells were upset even though they did not exhibit a significant ripple voltage. This invention is based upon that discovery.

Figure 3:
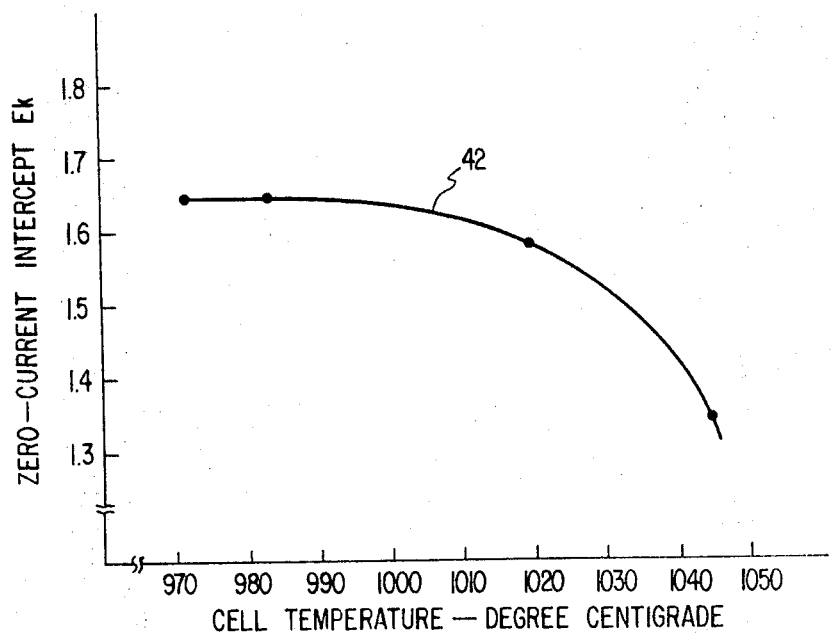
FIG. 3 is a graph illustrating the relationship between a cell's zero-current intercept $E_k$ and the cell temperature $T_b$.

In the course of the upset detection studies, an analysis was made of the relationships between various cell's bath temperatures ($T_b$) at any given time and their zero-current intercepts, $E_k$, at the same time. An analysis was then made of the $E_k$-$T_b$ relationships for 25 cells which did not exhibit significant ripple voltages. A plot of these relationships is represented by curve 42 of FIG. 3. From this curve, it was noted that the zero-current intercepts decreased very rapidly as the cell temperature increased; and, as noted above, a cell's bath temperature has generally been considered to be an indication of its condition (good or upset). Hence, a decrease in a cell's $E_k$ value is an indication that the cell is becoming upset. Of course, the Dewey application S.N. 411,463 dispelled the illusion that $E_k$ values were constant; but the decrease in $E_k$ values due to electrode upsets is quite a bit larger than the decrease due to changes in alumina content. Moreover, the Dewey application considers a cell's $E_k$ value to be independent of its temperature $T_b$. All of the implications of curve 42 of FIG. 3 are not fully understood at this time, but at least where electrode upsets are involved, it appears that a cell's $E_k$ value does change with temperature.

Similarly, the type of upset indicated by a rapid decrease of a cell's $E_k$ value is not fully understood. One theory, however, is that this upset is specifically related to the electrode processes. That is, it is possible that the upset exists in the neighborhood of the anode surface and/or in the neighborhood of the carbon-aluminum interface at the cathode. It is for this reason that this type of upset is described herein as being of the "electrode" type as opposed to the "low carbon" and "slugging" types.

Having described the aspect of the invention relating to the detection of "electrode" upsets, another aspect of the invention will now be described in connection with certain control operations to be taken after such upset is detected. In this respect, reference will be made to FIGS. 4 and 5 to both illustrate the control steps of the invention and also to point out certain increases in cell efficiency that are derived from the detection of electrode upsets in general and the invention's control operations in particular.

Figure 4:
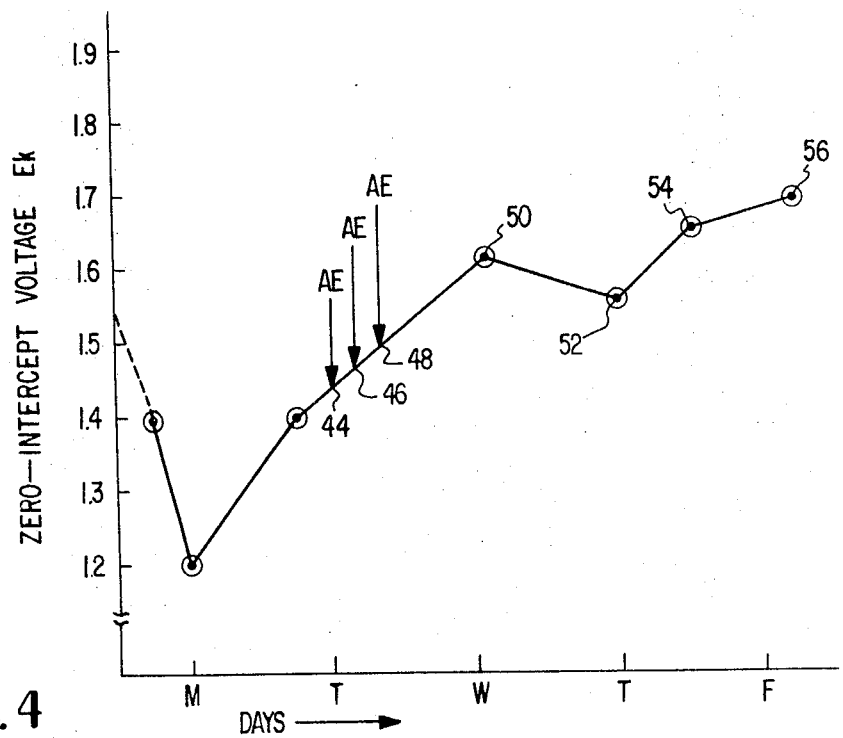
FIG. 4 is a graphic illustration of a test cell's zero-current intercept over a 4-day period.
Figure 5:
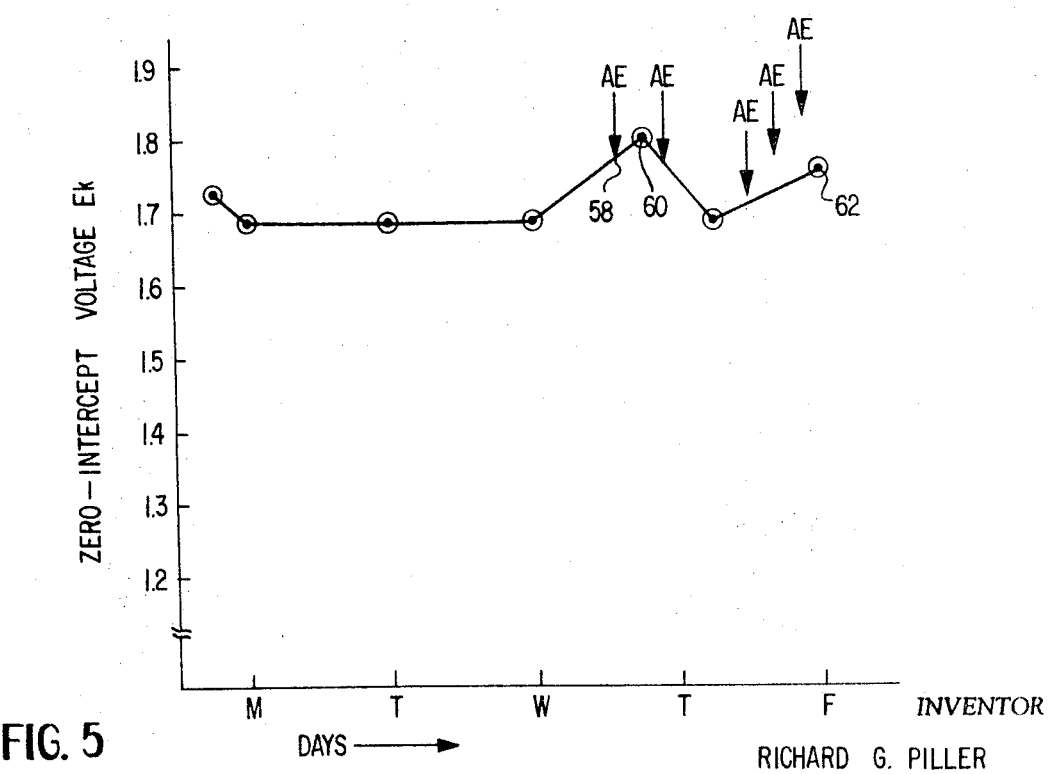
FIG. 5 is a graphic illustration of a normally operated cell's zero-current intercept over the same 4-day period as was used in connection with FIG. 4.

FIGS. 4 and 5 represent a record of data derived from two different alumina reduction cells which were simultaneously operated over the same period of about 4 days. The graph of FIG. 4 illustrates a cell which was operated in accordance with this invention. The graph of FIG. 5, however, relates to a more conventionally operated cell.

On the first day, the test cell of the invention, experienced a sharp zero-current intercept drop which extended through about 1.4 volts and on down to about 1.2 volts (note that this is an even sharper drop than is indicated by FIG. 3). Feeding was then stopped and the cell was forced into an anode effect about midway during the second day. This is represented by the symbol AE at point 44 of FIG. 4. The zero-current intercept was still below the normal value of about 1.65 volts for prebake cells (1.5 volts is about normal for Soderberg cells). Hence, the test cell was placed into another anode effect a few hours later; and for similar reasons a third anode effect was caused shortly after that. These latter two events are represented by points 46 and 48 in FIG. 4. By the third day, the test cell was operating at about a normal $E_k$ value of 1.62 volts (point 50). Midway, during the third day, the test cell's $E_k$ value began to drop from its value at point 50. Hence, feeding was again terminated. The test cell's $E_k$ value then decreased slightly to a level represented by point 52 in FIG. 4 and then began to increase to a more normal value represented by point 54. The tests were terminated on the fourth day, when the cell's $E_k$ value was at a level illustrated by point 56.

At the same time as the above tests were conducted, the $E_k$ values of a conventionally operated cell fluctuated slightly from a value of about 1.7 volts. At the end of the second day, however, its $E_k$ value rose sharply to about 1.8 volts at point 60 in FIG. 5, after having gone through an anode effect at point 58 thereof. The conventional cell then underwent a series of four additional anode effects during the last day and a half of the test and, at that time, as will be noted from its relatively high value at point 62 of FIG. 5, the cell was headed toward one or more other anode effects. From a comparison of the FIG. 4 and FIG. 5 curves, it will be apparent that the test cell which was operated in accordance with the present invention, underwent only three anode effects during the same period of time that the conventionally operated cell was required to undergo five such anode effects.

It should also be noted that not only did the test cell undergo fewer anode effects, but that its condition was obviously much more upset than was the conventional cell. Hence, while the test cell's anode effects were beneficial, the conventionally operated cell's anode effects merely resulted in reduced production.

The $E_k$ values of FIG. 5 indicate that the conventionally operated cell did not become upset during the tests. This was borne out by the cell's temperature which remained between about 970° C. and 990° C. throughout the entire four days of its test operation. It might be concluded, therefore, that the conventionally operated cell underwent five unnecessary anode effects. This resulted in an unnecessary increase of the mean voltage across the cell; a reduction in the total number of ampere hours of current supplied thereto; and four days of unnecessarily low aluminum production. One of the distinct advantages of the instant invention, therefore, is that it provides a means for determining when and how many times a cell should be subjected to intentional anode effects; or, alternatively, it provides a method for determining when anode effect treatment is not necessary. There may be other overriding reasons for operating a cell otherwise, but this invention provides direction in an area where it has previously been lacking.

Figure 6:
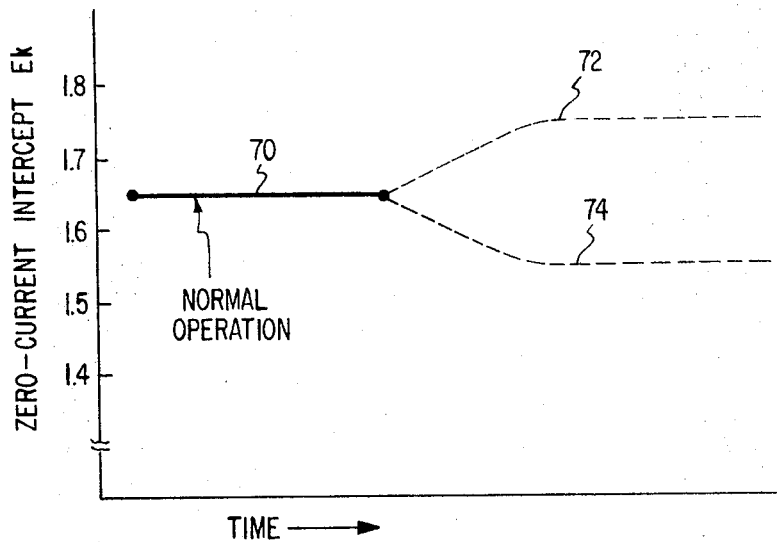
FIG. 6 is a schematic graphic illustration which is used to illustrate the operation of an alumina reduction cell in accordance with the principles of invention.

FIG. 6 will now be used to illustrate a more general approach to the practice of the invention as it relates to operating steps for correcting electrode upsets. Generally speaking, when a cell is in good condition, it is operated in accordance with a currently acceptable method. For example, for given cell parameters, a determination can be made of optimum alumina concentration. The cell may then be fed so as to maintain the dissolved alumina content near the optimum value; and the cell's anodes periodically adjusted so as to maintain the cell's bath resistance near a preselected value. In this respect the cell's bath resistance is equal to $(E - E_k)/I$ where $E$ and $I$ are the cell's terminal voltage and line current respectively and $E_k$ is a constant nominal zero-current intercept value that has been previously selected for that given cell. This type of operation reduces the frequency with which individual cells become upset. At the same time, however, the cell's ripple voltage is monitored. When a significant ripple voltage amplitude is detected, suitable steps are taken to either change the position of a maladjusted anode, or reduce the cell's feed, as the case may be. The instant invention adds to these procedures the concept of continuously monitoring a cell's zero-current intercept to determine whether it drops below a point which experience indicates corresponds to electrode upset conditions for that particular type of cell. In the FIG. 4 test cell, this value was found to be about 1.6 volts.

As noted, the above described normal control methods have been based upon the assumption that a cell's $E_k$ value is constant. But, a cell's $E_k$ value is not constant at all times. Hence, when an abnormal $E_k$ value is detected, certain adjustments should be made. In this respect, I prefer to assume a constant $E_k$ so long as it remains at its normal value. When the $E_k$ value rises above about 1.7 as illustrated by dotted line 72, however, the cell is still fed in proportion to the bath resistance but the calculation of bath resistance is based upon an appropriately increased $E_k$ value; which tends to indicate a need that the cell's anode be raised. In this respect, it is preferable to use a "substituted" $E_k$ value which is increased by only about half the difference between the cell's normal value and its periodically determined value.

When the value of $E_k$ falls below the lower limit of the predetermined range, such as 1.6 volts in FIG. 6, the rate of alumina feed is restricted so that the cell undergoes one or more anode effects in a relatively short period of time. This, for example, was the technique employed in bringing the FIG. 4 test cell up to point 50 after it had become seriously upset as evidenced by its extremely low $E_k$ value on the first day of its test operation.

While the invention has been particularly shown and described with reference to preferred embodiments thereof, it will be understood by those skilled in the art that various changes in form and details may be made therein without departing from the spirit and scope of the invention. For example, although the invention has been described in terms of measuring and plotting certain variables, it will be apparent to those skilled in the art that analog and/or digital computers can be used to perform these functions with much more facility and rapidity. In fact, a computer has been very effectively used to carry out the principles of the invention with a minimum amount of time and effort so as to obtain a practical maximum efficiency level from the alumina reduction cells that were thusly operated.

What is claimed is:

1. A method of detecting upsets occurring during operation of an electrolytic cell for the reduction of dissolved alumina comprising the steps of:
   selecting a nominal zero-current intercept value corresponding to normal operation of said cell;
   ascertaining and monitoring the value of the actual zero-current intercept as operation of the cell proceeds;
   comparing said actual zero-current intercept values with said nominal zero-current intercept value; and
   generating an electrode upset signal when the actual zero-current intercept value is a predetermined amount lower than said nominal zero-current intercept value to indicate that the cell is undergoing an electrode upset.

2. The method of claim 1 wherein said electrolytic cell receives periodic feedings of alumina into the bath thereof and including the step of correcting the electrode upset condition indicated by said electrode upset signal by reducing the amount of alumina added to said bath.

3. The method of claim 1 including the step of correcting the electrode upset condition indicated by said electrode upset signal by causing said cell to undergo an anode effect.

4. The method of claim 1 wherein said electrolytic cell has an essentially DC power source for applying current across an anode and a cathode thereof and including the steps of:
   detecting low frenquency variations of the DC voltage applied to the cell and measuring the amplitude thereof;
   generating a low-ripple-voltage output signal when the amplitude of said low frequency variation is less than a predetermined value; and
   combining said low-ripple-voltage output signal and said electrode upset signal wherein said electrode upset signal is generated upon the occurrence of both:
      (i) said low-ripple-voltage output signal; and
      (ii) an actual monitored zero-current intercept value that is a predetermined amount lower than said nominal zero-current intercept value.

5. The method of claim 4 wherein said electrolytic cell receives periodic feedings of alumina into the bath thereof and including the steps of correcting the electrode upset condition indicated by said electrode upset signal by reducing the amount of alumina added to said bath.

6. The method of claim 4 including the step of correcting the electrode upset condition indicated by said electrode upset signal by causing said cell to undergo an anode effect.

7. A method of operating an electrolytic cell for the reduction of dissolved alumina wherein alumina is periodically fed to a molten salt bath in accordance with a resistance signal which is proportional to $(E - E_k)/I$, wherein E and I are the cell's terminal voltage and line current respectively and $E_k$ is the cell's zero current intercept value, comprising the steps of:
   selecting a nominal zero-current intercept value corresponding to normal operation of said cell;
   ascertaining and monitoring the actual value of said zero-current intercept as operation of said cell continues;
   comparing the actual zero-current intercept values with said nominal zero-current intercept value to determine the difference therebetween;
   compensating the nominal zero-current intercept value by an amount that is proportional to the difference between said nominal zero-current intercept value and said actual zero-current intercept value;
   generating compensated resistance signals proportional to $(E - E_{kc})/I$, where $E_{kc}$ is the compensated zero current intercept value; and
   feeding alumina to said cell in accordance with said compensated resistance signal.

8. The method of claim 7 wherein said nominal zero-current intercept value is compensated by half the difference between said nominal zero current intercept value and said actual zero current intercept value.

9. The method of claim 7 wherein said cell is caused to undergo an anode effect when said actual zero-current intercept value is a predetermined amount less than said nominal zero current intercept value.

References Cited

UNITED STATES PATENTS

| | | | |
|---|---|---|---|
| 3,380,897 | 4/1968 | Dewey | 204—67X |
| 3,400,062 | 9/1968 | Bruno et al. | 204—67 |
| 3,434,945 | 3/1969 | Schmitt et al. | 204—67 |
| 3,455,795 | 7/1969 | Boulanger et al. | 204—67 |
| 3,471,390 | 10/1969 | Kibby et al. | 204—67X |

TA-HSUNG TUNG, Primary Examiner

D. R. VALENTINE, Assistant Examiner

U.S. Cl. X.R.

204—1; 324—71